(12) United States Patent
Shu et al.

(10) Patent No.: US 7,162,888 B2
(45) Date of Patent: Jan. 16, 2007

(54) ROBOT-BASED AUTOMATION SYSTEM FOR CRYOGENIC CRYSTAL SAMPLE MOUNTING

(75) Inventors: Deming Shu, Darien, IL (US); Andrzej Joachimiak, Bolingbrook, IL (US); Curt A. Preissner, Rosemont, IL (US); Daniel Nocher, Elwood, IL (US); Yufeng Han, Chicago, IL (US); Juan Barraza, Jr., Los Alamos, NM (US); Peter Lee, Wheaton, IL (US); Wah-Keat Lee, Oak Park, IL (US); Zhonghou Cai, Naperville, IL (US); Stephan Ginell, Naperville, IL (US); Randy Alkire, Romeoville, IL (US); Robert G. Schuessler, Downers Grove, IL (US)

(73) Assignee: UChicago Argonne LLC, Chicago, IL (US)

( * ) Notice: Subject to any disclaimer, the term of this patent is extended or adjusted under 35 U.S.C. 154(b) by 440 days.

(21) Appl. No.: 10/807,599

(22) Filed: Mar. 24, 2004

(65) Prior Publication Data
US 2004/0187515 A1    Sep. 30, 2004

Related U.S. Application Data

(60) Provisional application No. 60/459,101, filed on Mar. 31, 2003.

(51) Int. Cl.
*F25D 25/00*    (2006.01)
*F25B 19/00*    (2006.01)
*H05G 1/00*    (2006.01)

(52) U.S. Cl. .............................. 62/378; 62/62; 62/51.1; 378/208

(58) Field of Classification Search ................. 62/378, 62/51.1, 62; 378/79, 208; 294/100
See application file for complete search history.

(56) References Cited

U.S. PATENT DOCUMENTS

| | | | | |
|---|---|---|---|---|
| 4,621,332 A | * | 11/1986 | Sugimoto et al. | 700/260 |
| 4,768,356 A | * | 9/1988 | Volker | 62/51.1 |
| 4,819,978 A | * | 4/1989 | Scheinman et al. | 294/119.1 |
| 5,905,430 A | * | 5/1999 | Yoshino et al. | 340/407.1 |
| 6,302,327 B1 | * | 10/2001 | Coelho et al. | 235/383 |
| 2002/0054663 A1 | * | 5/2002 | Olson et al. | 378/79 |
| 2003/0090115 A1 | * | 5/2003 | Kim et al. | 294/106 |

(Continued)

*Primary Examiner*—William C. Doerrler
(74) *Attorney, Agent, or Firm*—Joan Pennington

(57) ABSTRACT

A method and robot-based automation system are provided for cryogenic crystal sample mounting, for example, for use for cryogenic crystal sample mounting in the x-ray crystallography station at an x-ray source. The system includes a robot arm carrying a handset. The handset includes a pair of elongated fingers for sample mounting, and each finger carrying a set of strain gauge arrays for providing force sensing. A slim finger design allows a sample mounting process with no interference with the beam stop, cryostreem and x-ray detectors. The handset can detect the contact force intensity and direction; provide a precise gripping action; and feel the results of the gripping. The finger design incorporates a mechanism to maintain the sample temperature well below the cryogenic safety margin for the crystal viability. A Dewar container is provided with an ice control system and liquid nitrogen flow control. A triangular sample magazine maximizes the Dewar space usage. A miniature kinematical mounting sample holder provides near micron positioning repeatability. These capabilities make the robot-arm more powerful, flexible, and reliable.

19 Claims, 6 Drawing Sheets

U.S. PATENT DOCUMENTS

2003/0140713 A1* 7/2003 Ohsato et al. ......... 73/862.041
2003/0196444 A1* 10/2003 Felder et al. ................. 62/177
2004/0008814 A1* 1/2004 Shafer ......................... 378/79
2004/0012217 A1* 1/2004 Shafer et al. ............... 294/100

* cited by examiner

ROBOT-BASED AUTOMATION SYSTEM FOR CRYOGENIC CRYSTAL SAMPLE MOUNTING

This application claims the benefit of U.S. Provisional Application No. 60/459,101, filed on Mar. 31, 2003.

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to a method and robot-based automation system for the mounting and alignment of crystals to be examined in an x-ray beam. The complete process is carried out at extremely low temperatures in order to minimize potential damage to the crystals.

DESCRIPTION OF THE RELATED ART

X-ray crystallography is an important method by which the three dimensional structure or shape of molecules can be determined. One of the most important class of molecules examined are proteins and with the recent completion of the human genome, biologists are now seeking new ways to solve protein structures in a high-throughput mode. Along with the generation of high-throughput protein production and crystallization methods high-throughput methods for X-ray data collection need to be developed. A limiting step in the collection of high throughput x-ray data collection is the mounting and alignment of individual protein crystals in the X-ray beam which is normally done by hand.

The Genome Project determined the entire DNA sequence of the human genome. The complete sequences for 180 organisms, from three kingdoms (bacteria, archaea and eukarya) as well as several organelles and virus genomes have already been determined. Currently there are over 1084 active genome sequencing projects with over 1.8 million genes already sequenced. These data provide a significant fraction of the fundamental information necessary to understand the properties of the 40,000 proteins that are estimated to be coded by the human genome. A complete understanding of the functions of biological systems requires a detailed knowledge of the relationships between the amino acid sequence and the structure and function of the protein. An estimate has been made, based on an analysis of existing genome sequences and protein structures, that between 2,000–5,000 unique folding motifs exist in the entire set of protein structures. It is also estimated that to discover the majority of new protein folds structures for 15,000–20,000 protein families would need to be experimentally determined.

A new field has been established named structural genomics. The objective of structural genomics is to determine structures of all protein families and to develop high-throughput technologies to accomplish this goal at an acceptable cost and in reasonable time frame. X-ray crystallography is the most important method used to determine protein structure. Structural genomics takes advantage of potential in genome sequence analysis, molecular, structural and computational biology and high-throughput data collection and structure determination at the third generation synchrotron beamlines. The structures themselves will have an enormous impact on our understanding of structure/function/sequence relationships in proteins. In general, results generated and the technology developed in the course of structural genomics will be instrumental in the examination of a broad range of practical biomedical, health effects, and environmental remediation problems. Beneficiaries will comprise academic research, government and pharmaceutical as well as biotechnology industries.

X-ray crystallography is the primary method to determine the 3D structures of complex macromolecules at atomic resolution. In the years to come, the APS, and similar third generation synchrotron sources developed elsewhere, will become the most powerful tools for studying atomic structures of biological molecules, because these facilities dramatically speed up the process of data collection with improved data quality and simplify structure determination.

One of limitations in reaching the target goals of structural genomics is the current capability of instrumentation at third generation synchrotron beamlines. The target goal is governed by the need to determine the structure of a large number of protein crystal samples. Furthermore, added constraints increase the number of samples to be investigated. They are (a) short exposures to radiation in order to reduce the crystal damage, thus increasing the number of samples of one kind to be exposed, and (b) additional data sets to be collected for each structure with different contrast agents containing "heavy atom" (such as Se, Br, Eu, Re, Os, It, Pt, Au, Hg, Pb, U), necessary to determine the phase of the structure. In addition, crystals are fragile and show significant variations in quality, therefore several crystals need to be tested to find data quality crystal specimens. Crystals are mounted typically in a small nylon loop on top of a pin mounted on a small pedestal. These devices are commercially available from several vendors. The bottleneck for collecting data sets on each structure is the constant need to change and realign each protein crystal. This task currently involves considerable manpower as well as time. In fact, in some cases, the time involved in sample manipulation exceeds the time required for data collection. Therefore, there is a problem to solve.

The constant need to change samples is due to radiation damage and/or change to a different protein crystal altogether. A need exists for a flexible automated sample mounting system will help to solve this bottleneck problem.

A principal object of the present invention is to provide robotic techniques in order to increase the efficiency of sample delivery with a robot-based automation system for cryogenic crystal sample mounting for the data collection facilities at synchrotron and home sources.

SUMMARY OF THE INVENTION

In brief, a method and robot-based automation system are provided for cryogenic crystal sample mounting, for example, for use for cryogenic crystal sample mounting in the x-ray crystallography station at an x-ray source. The system includes a robot arm carrying a handset. The handset includes a pair of elongated fingers for sample mounting, and each finger carrying a set of strain gauge arrays for providing force sensing.

In accordance with features of the invention, the handset, with the set of strain gauge arrays providing intelligent contact sensors, enables accurate sample gripping with equipment protection functionality. A slim finger design allows a sample mounting process with no interference with the beam stop, cryostreem and x-ray detectors. The fingers thermal design ensured the sample temperature lower than 105° K during the mounting process. The strain gauges make this robot handset more intelligent and perform more like a human hand to ensure a high reliability performance. The handset can detect the contact force intensity and direction; provide a precise gripping action; and feel the results of the gripping.

In accordance with features of the invention, a Dewar container is provided with an ice control system and liquid nitrogen flow control. The robot-arm has six-degree of freedom, which is important for the kappa-diffractometer configuration. The robot-arm used in the commercial system only has five-degree of freedom.

In accordance with features of the invention, a miniature liquid nitrogen reservoir with a check valve is mounted on one of the fingers of the robot handset close to the fingertip. During the initial cooling process the handset is open and the miniature reservoir is submerged in the liquid nitrogen storage Dewar. A check valve ball is unseated allowing air to exit and liquid nitrogen to fill the reservoir through a jet hole and the check valve. In the crystal retrieval orientation, the check valve is closed, preventing loss of the liquid nitrogen and leaving the jet hole as the only opening. During the robot movement for retrieval, gradual warming of the fingers has vaporized liquid nitrogen from the reservoir resulting in a dry nitrogen jet flowing from the jet hole. The dry nitrogen jet shrouds and cools the sample as the finger close around it. The dry nitrogen is also ensuring the sample remains purged of room air during the entire retrieval process, culminating with the return of the crystal to the storage Dewar.

In accordance with features of the invention, a triangular sample magazine maximized the Dewar space usage. For example, a total of 120 samples can be arranged in the Dewar, which could only contain maximum 96 samples if commercial round shape sample magazines were used. The miniature kinematical mounting sample holder provides near micron positioning repeatability. These capabilities make the robot-arm more powerful, flexible, and reliable.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a robotic system is provided that can efficiently and effectively carry out this process, without human intervention and which can hold a total, for example, of 120 different crystal samples at the correct cryogenic temperature. This invention should dramatically increase the rate at which protein structures can be determined experimentally.

Figure 1:
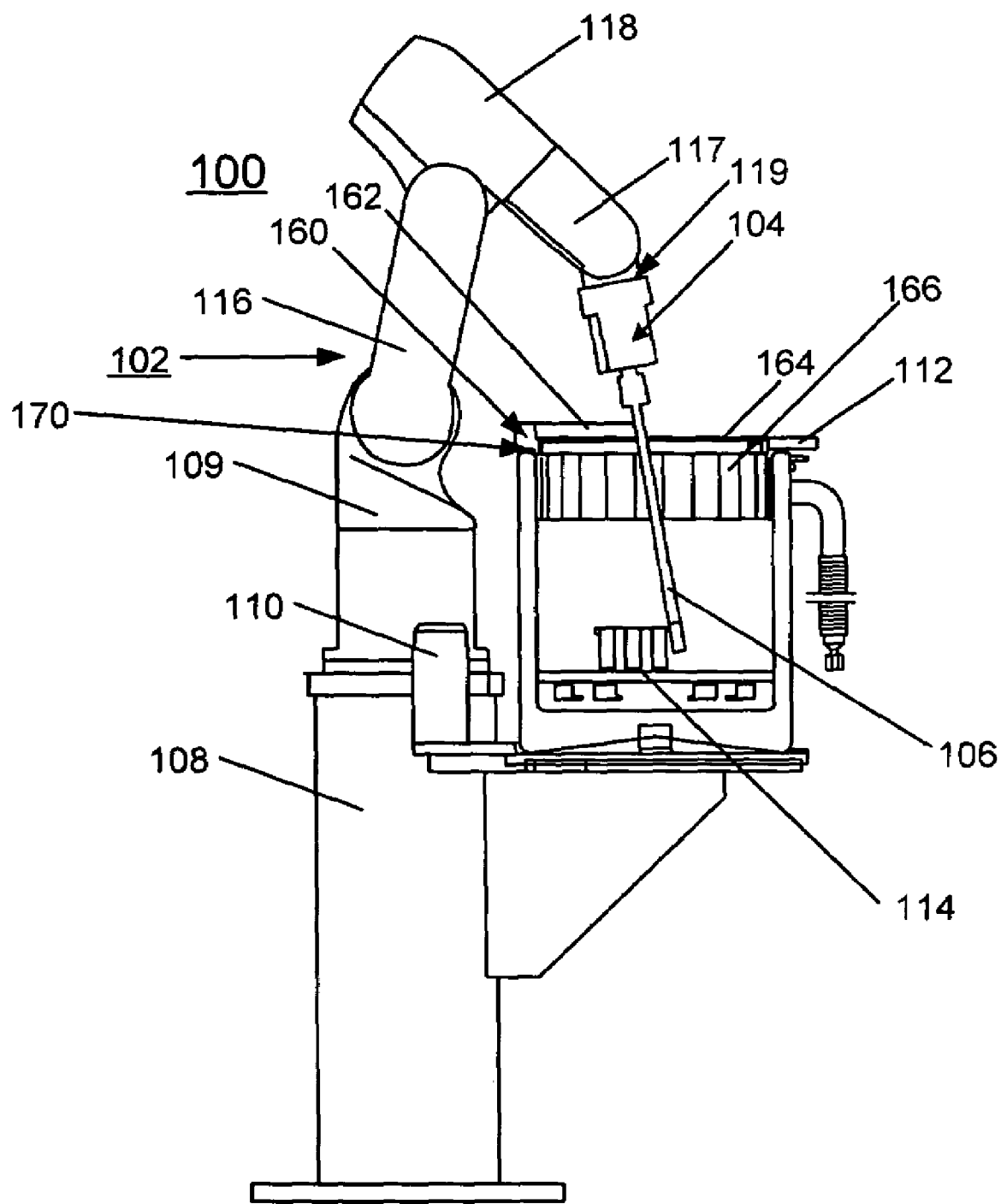
FIG. 1 is a side-view of the robot-based automation system for cryogenic crystal sample mounting in accordance with the preferred embodiment.

Having reference now to the drawings, FIG. 1 shows the side-view and top-view of the robot-based automation system for cryogenic crystal sample mounting generally designated by reference character 100 in accordance with the preferred embodiment. System 100 includes an industrial robot arm generally designated by reference character 102.

In accordance with features of the invention, system 100 provides an industrial robot-based automation system for cryogenic crystal sample mounting. With this system 100, for example up to 120 of crystal samples, in eight magazines, each containing 15 samples, can be prepared at liquid nitrogen temperature. Under computer control, samples can be mounted to or retrieved from an x-ray diffractometer (not shown) by robot-arm 102 with programmable sequences. Sample temperature has been measured at lower than 105 K during the four second mounting process.

In accordance with features of the invention, system 100 provides for the automation of the crystal change procedure in the form of: (a) an automatic mounting tool which allows users to place a sample crystal from liquid nitrogen storage on to the goniostat and retrieve it, (b) a micron-precision crystal mounting goniometer, (c) a liquid nitrogen compatible sample transport system which will allow the transfer of the crystal sample into the experimental station, (d) a multi-sample mounting system or cartridge which will permit automatic sample change and (e) new alignment tools and procedures. The advantages provided are: to reduce the frequency of the experimental station access, and the time it takes to align each sample. The features and advantages are provided while maintaining sample cryogenic temperature and integrity throughout the process of data collection, from crystal mounting to alignment and to the actual exposure to X-rays.

Industrial robot arm 102 includes a unique custom-made handset generally designated by reference character 104 with intelligent contact sensors provide accurate sample gripping with equipment protection functionality. A pair of unique slim long fingers 106 expanded the robot arm's reach range, which is critical to the general design of system 100. Industrial robot arm 102 includes a supporting base 108 carrying a handset dryer 110, and a Dewar container generally designated by reference character 112 containing a sample magazine holder 114 of the preferred embodiment. Supporting base 108 locates the industrial robot arm 102, enclosed are a rotating shoulder 109, a pair of pivoting links 116 and 118, coupled to a pair of rotating members 117 and 119, to which mounts the handset 104. Since the robot base 108 can be placed further away from the diffractometer, more space is available for beamline instrument, and there is no interference with the beam stop in the sample mounting process.

In accordance with features of the invention, the custom-made handset 104 with intelligent contact sensors illustrated and described with respect to FIGS. 4, 5A, 5B, 5C, 5D, and 5E provides accurate sample gripping with equipment protection functionality. The robot-arm 102 has six-degree of freedom, which is important for the kappa-diffractometer configuration. A conventional robot-arm used in the commercial system only has five-degree of freedom. A design of the slim fingers 106 allows a sample mounting process with no interference with the beam stop. The thermal design of fingers 106 ensures the sample temperature lower than 105 K during the mounting process.

Triangular Sample Magazine

Figure 2A:
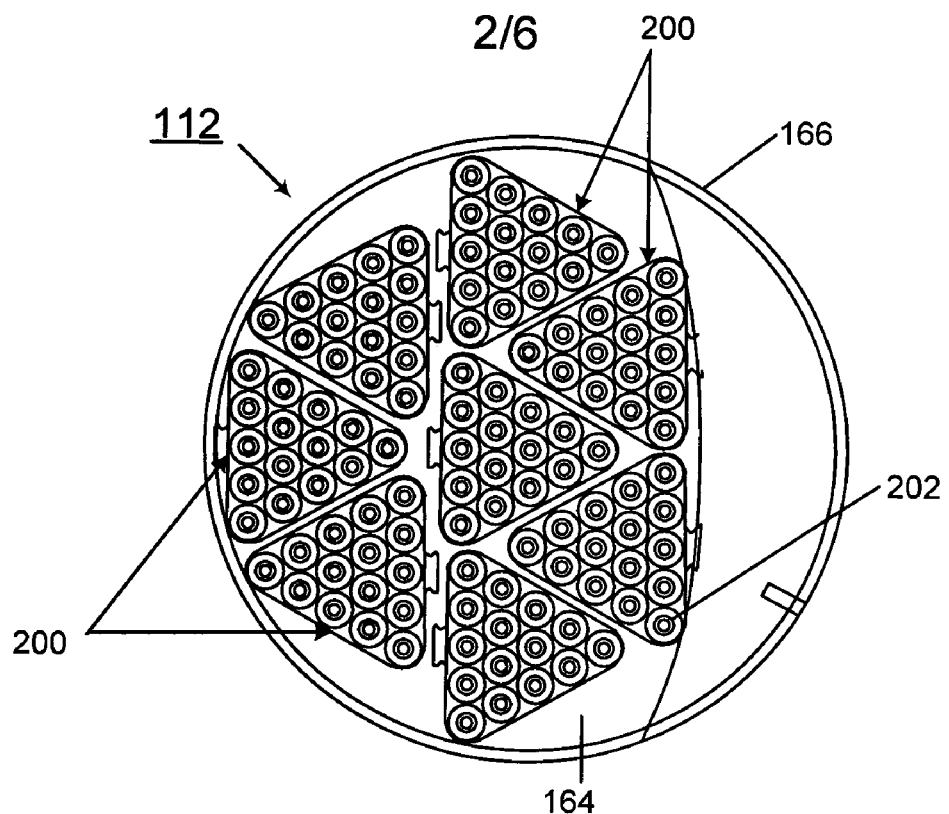
FIGS. 2A and 2B respectively illustrate a triangular sample magazine configuration of the automation system of FIG. 1 mounting in accordance with the preferred embodiment and a conventional round magazine configuration.
Figure 2B:
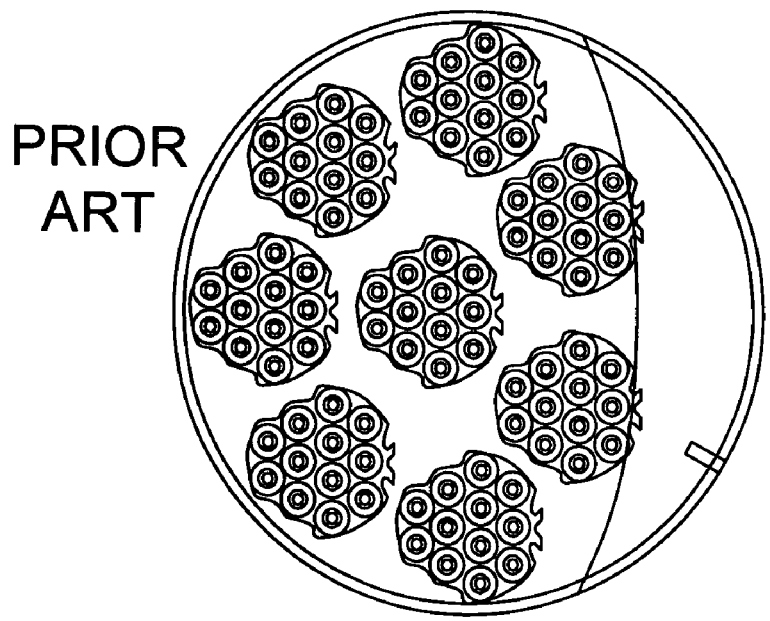

Referring now to FIGS. 2A and 2B, to maximize the Dewar space usage, the sample magazine holder 114 includes a plurality of triangular shaped sample magazines 200, each containing a plurality of sample 202 of the invention. As shown in FIG. 2A, a total of 120 samples can be arranged in the Dewar container system 112, which could only contain maximum 96 samples if commercial round shape sample magazines were used as illustrated in FIG. 2B.

Figure 3:
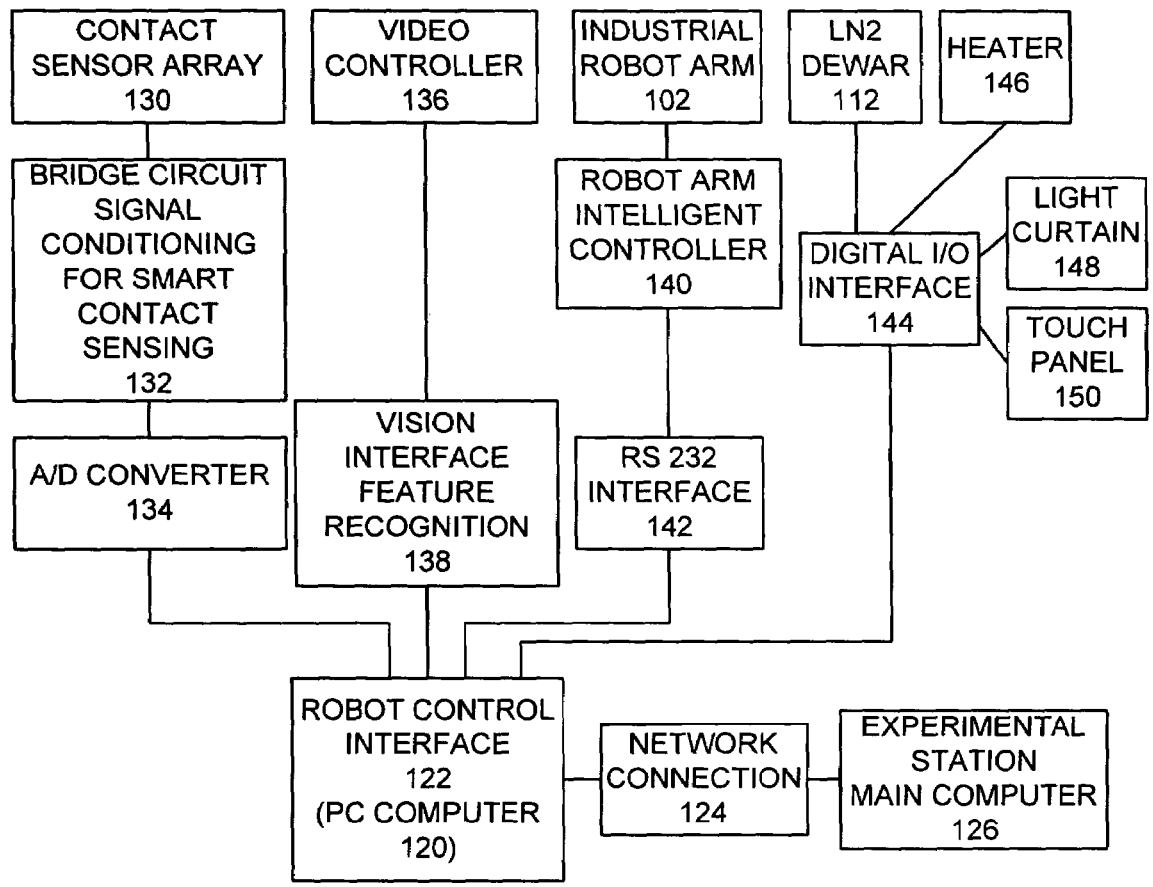
FIG. 3 is a schematic diagram representation of the automation system of FIG. 1 mounting in accordance with the preferred embodiment.

Referring now to FIG. 3, there is shown a schematic diagram of the automation system 100. The system 100 is implemented with real-time and parallel control mechanisms for robot operating and system monitoring. The modules for robot control are distributed in a dedicated robot controller and/or PC computer 120 providing a robot control interface 122 and event-driven by the PC computer 120 using a network connection communication 124 coupled to an experimental station main computer 126.

In accordance with features of the invention, the focus of the PC computer 120 is on five basic parts: command input for robot control; dynamic sensing the finger status through strain gauge array; tracking sample positions by machine vision; monitoring the safety status of light curtain and touch panel; and monitoring switches for the heater and liquid nitrogen level sensor.

In system 100, the controller or PC computer 120 is coupled to a contact sensor array 130 by a bridge circuit 132 providing signal conditioning for smart contact sensing and an analog-to-digital (A/D) converter 134. A video camera 136 for tracking sample positions by machine vision is coupled to the controller PC computer 120 by a vision interface function 138 providing feature recognition. A robot arm intelligent controller 140 is coupled by an RS 232 interface 142 to the controller PC computer 120. A digital input/output (I/O) interface 144 couples the controller PC computer 120 to the Dewar container 112, a heater 146, a light curtain 148, and a touch panel 150.

The PC-controlled monitoring robot-based automation system 100 can be implemented, for example, with commercial multifunctional Data acquisition boards, including six signal conditioning/analog input channels 134 for strain gauge signals from contact sensor array 130, one video channel 138 for camera 136 and four digital I/O channels 144 for relays from light curtain 148, touch panel 150, Dewar container 112, and heater 146.

Force Sensitive Robot Handset 104

Figure 4A:
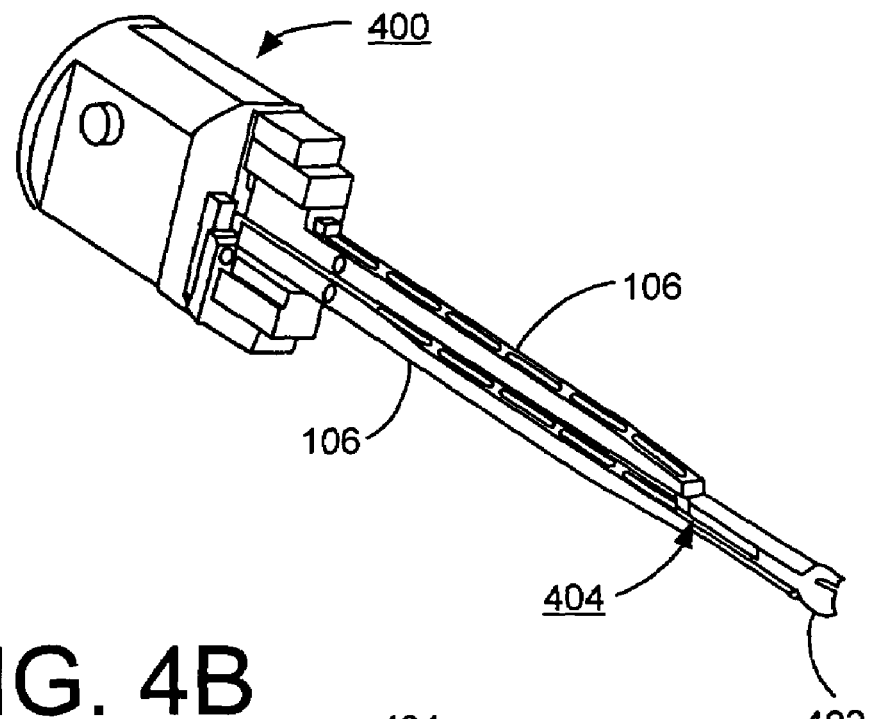
FIGS. 4A, 4B, and 4C illustrates a force sensitive robot handset of the automation system of FIG. 1 mounting in accordance with the preferred embodiment.
Figure 5A:
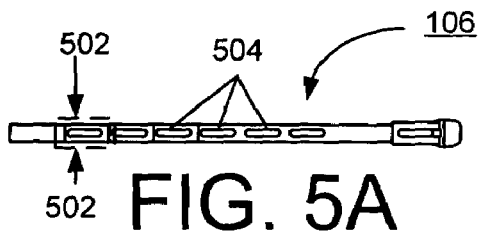
FIGS. 5A, 5B, 5C, 5D and 5E illustrate details of the force sensitive robot handset of the automation system of FIG. 1 mounting in accordance with the preferred embodiment.
Figure 5B:
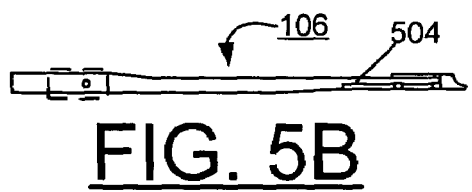

Referring to FIGS. 4A, 5A and 5B, the force sensitive robot handset 104 provides unique force sensing capability, enabling the determination of hand open and closed states, work piece detection, and resolution of applied force magnitude and direction. As shown in FIG. 4A, the handset 104 consists of two primary components, a servomotor actuated gripper generally designated by reference character 400, and a pair of novel slim fingers 106 equipped with force sensor arrays 130 with integrated force sensing capability. The servomotor actuated gripper 400 is a commercially available item, compatible with the electronics and mounting flange of the relevant robot. The fingers 106 are custom machined components, identical in mechanical design and sensor layout. The pair of fingers 106 support a sample mounting member or gripper member 402 for receiving and transporting a sample to an experimental station by the robot-based automation system 100.

Figure 4B:
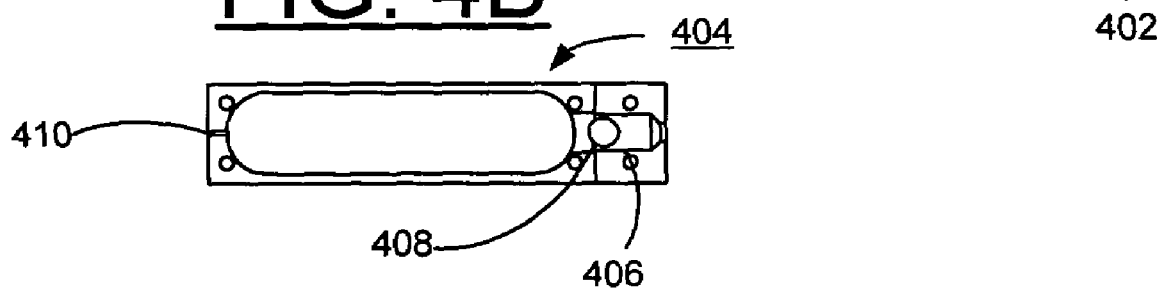
Figure 4C:
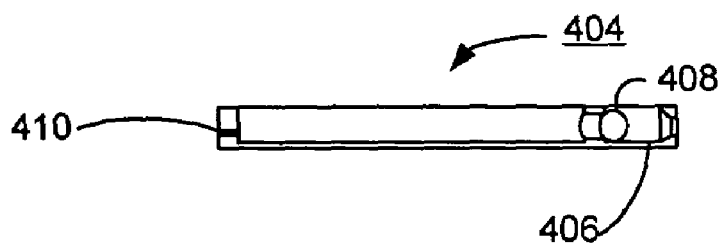

In accordance with features of the invention, as shown in FIGS. 4B and 4C, a miniature liquid nitrogen reservoir generally designated by reference character 404 with a check valve 406 is mounted on one of the fingers 106 of our custom-made robot handset 104 close to the fingertip 402. During the initial cooling process the handset is open and the miniature reservoir is submerged in the liquid nitrogen storage Dewar 112. The check valve ball 408 is unseated allowing air to exit and liquid nitrogen to fill the reservoir through the jet hole 410 and the check valve 406. In the crystal retrieval orientation, the check valve 406 is closed, preventing loss of the liquid nitrogen and leaving the jet hole 410 as the only opening. During the robot movement for retrieval, gradual warming of the fingers 106 has vaporized liquid nitrogen from the reservoir 404 resulting in a dry nitrogen jet flowing from the jet hole 410. The dry nitrogen jet shrouds and cools the sample as the fingers 106 close around it. The dry nitrogen is also ensuring the sample remains purged of room air during the entire retrieval process, culminating with the return of the crystal to the storage Dewar 112.

It has been experimentally proven that, using this new finger design with the miniature liquid nitrogen reservoir 404, no ice formation was detected in the cryogenic crystal with up to seven cycles of robotic crystal mounting and retrieval, since the crystal temperature has been kept well below the cryogenic safety margin for the crystal viability.

Figure 5E:
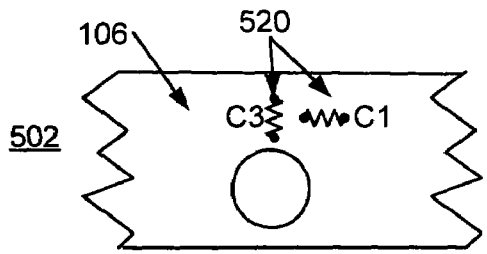
Figure 5C:
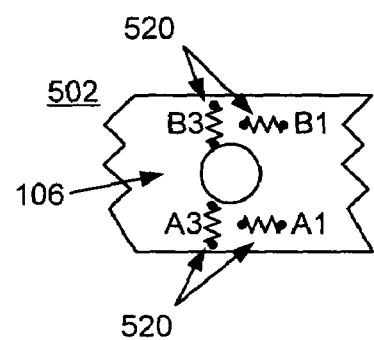
Figure 5D:
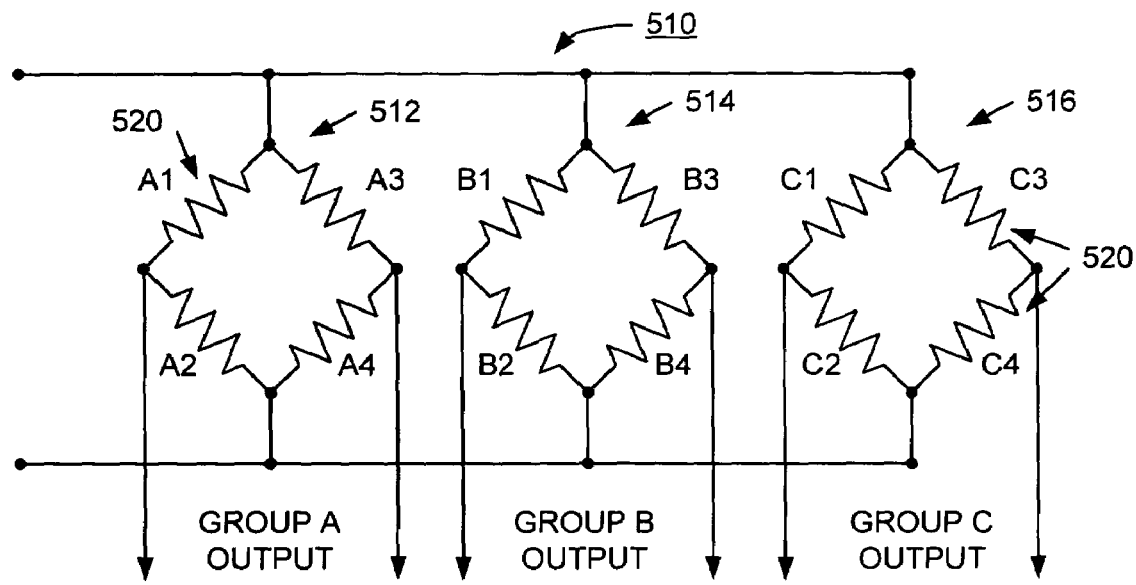

Referring also to FIGS. 5C, 5D and 5E, fingers 106 include a strain gauge layout area generally designated by reference character 502 and a plurality of elongated, spaced apart apertures 504 disposed along the length of fingers 106. The geometry of the fingers 106 has been optimized by sizing the finger cross-section to provide increased force sensitivity.

As shown in FIG. 5D, a set 510 of three separate strain gauge sensor arrays 512, 514, 516 are bonded to each finger 106 at predefined locations within area 502. Each finger 106 incorporates the three separate strain gauge arrays 512, 514, 516, with a plurality of strain gauges 520 for each array arranged in a Poisson configuration as shown in FIGS. 5C, 5D and 5E. For each strain gauge array 512, 514, 516 is arranged as a corresponding Wheatstone bridge sensing circuit. Each of the strain gauge arrays 512, 514, 516 include a bridge arrangement consisting of two active strain gauges in adjacent arms labeled A1, A3; B1, B3; and C1, C3 and two fixed resistances labeled A2, A4; B2, B4; and C2, C4. Strain gauge arrays 512, 514, 516 include active strain gauges and fixed resistances A1, A3, and, A2, A4; B1, B3, and B2, B4; C1, C3, and C2, C4 coupled in series between an input excitation voltage and arranged as shown in FIGS. 5C, 5D and 5E. A group A output is provided between the junction connection bridge elements A1, A2, and A3, A4. A group B output is provided between the junction connection bridge elements B1, B2, and B3, B4. A group C output is provided between the junction connection bridge elements C1, C2, and C3, C4. Inherent temperature compensation is obtained by connecting each pair of strain gauges in adjacent arms of the Wheatstone bridge circuit.

In accordance with features of the invention, the custom-made handset 104 with the set 510 of strain gauge arrays 512, 514, 516 imitates human hand's contact nerve network. The strain gauges 520 enables robot handset 104 to perform more intelligently and to perform more like a human hand to ensure a high reliability performance. Force sensitive robot handset 104 can detect the contact force intensity and direction; provide a precise gripping action; and feel the results of the gripping.

The three sensor arrays 512, 514, 516 per finger 106 allow for resolution of axial compression, grasp direction bending, and transverse direction bending. The state of the finger can be determined by considering the output signals from the sensing circuits in the following manner:

Upon determination of an unsafe or erroneous finger position, corrective action is taken to move the gripper to a safe location. The output from each set of strain sensors is used to calculate the direction of force application, which the control system will then alleviate. The possible gripper load modes were considered in order to establish the signal output configurations.

TABLE I

Sensor output change.

| Load Mode | Right Finger | | | Left Finger | | |
|---|---|---|---|---|---|---|
| | 1 | 2 | 3 | 1 | 2 | 3 |
| Landing | + | − | + | + | − | + |
| Sample Grasping | − | + | − | − | + | − |
| Force from front | − | − | + | + | + | − |
| Force from rear | + | + | − | − | − | + |
| Force from right | + | − | + | − | + | − |
| Force from left | − | + | − | + | − | + |

Table 1 documents the change in output from each strain gauge array 512, 514, 516 respectively labeled 1, 2, and 3 for right and left fingers 106. Inspection of these changes directed the development of the algorithms used to work out the appropriate robot action. Six algebraic expressions were conceived, the results of which can be directly compared. Development of the expressions is shown below.

First, the output of each sensor array 512, 514, 516 is shifted to account for the zero offsets. Then each channel is normalized with respect to the gain of the signal conditioning system for that particular channel.

$$R1 = \frac{(R1_O - R1_{zero})}{G1} \quad R2 = \frac{(R2_O - R2_{zero})}{G2} \quad R3 = \frac{(R3_O - R3_{zero})}{G3}$$

$$L1 = \frac{(L1_O - L1_{zero})}{G4} \quad L2 = \frac{(L2_O - L2_{zero})}{G5} \quad L3 = \frac{(L3_O - L3_{zero})}{G6}$$

Where the following hold: the subscript O indicates output, the subscript zero indicates the zero value for a particular channel, and G represents the gain for a particular channel.

The algebraic output expression for each load case, with respect to the gripper coordinate system, can then be written:

$$LND = \Sigma(R3,L3) + |\Sigma(R1,R2,L1,L2)|$$

$$GRSP = \Sigma(R2,L2) + |\Sigma(R1,R3,L1,L3)|$$

$$XDIR = \Sigma(R1,R2,L3) + |\Sigma(L1,L2,R3)|$$

The expression result is positive for the +X direction.

$$YDIR = \Sigma(R1,L1,L3) + |\Sigma(L1,R2,R3)|$$

The expression result is positive for the +Y direction.

Open-Top Liquid Nitrogen Dewar Ice Prevention System

Referring to FIGS. 1, and 2A, the Dewar container 112 is an open-top liquid nitrogen Dewar system with an ice prevention or control system generally designated by the reference character 160 that allows for the extended use of a liquid nitrogen Dewar without a mechanical lid in a standard room atmosphere. Without the ice prevention system 160, room air and water vapor would condense and freeze on the rim of the Dewar, resulting in the contamination of the material stored in the Dewar. Three unique features constitute the novel ice control system 160: 1) a perforated plastic ice control tube 162 provides many nitrogen jets supplying a curtain of cold, dry nitrogen over a top 164 of the Dewar container 112, perpendicular to a longitudinal axis of the Dewar container 112, 2) an insulating collar 166 covering the rim of the Dewar container 112, and 3) a flow control mechanism generally designated by reference character 170 for maintaining the movement of cool dry nitrogen out of the Dewar container. The jets provided by the perforated plastic ice control tube 162 prevent the humid ambient air from entering the nitrogen Dewar container. The insulating collar 166 serves two functions, insulating the cold upper surfaces of the Dewar container 112 from the ambient air, and preventing a short-circuit, resulting in the mixing of ambient air at the upper lip 164 of the Dewar. The flow control mechanism 170 prevents mixing with ambient air by continually forcing the cool, dry nitrogen within the Dewar container 112 up into the flow curtain provided by the nitrogen jets from control tube 162.

In accordance with features of the invention, a triangular sample magazine maximized the Dewar space usage. A total larger number of samples can be arranged in the Dewar container system 112 as to a conventional commercial round shape sample magazine. A miniature kinematical mounting sample holder provides near micron positioning repeatability. These capabilities make the robot-arm 102 more powerful, flexible, and reliable.

Miniature Kinematical Mounting Sample Holder

Figure 6A:
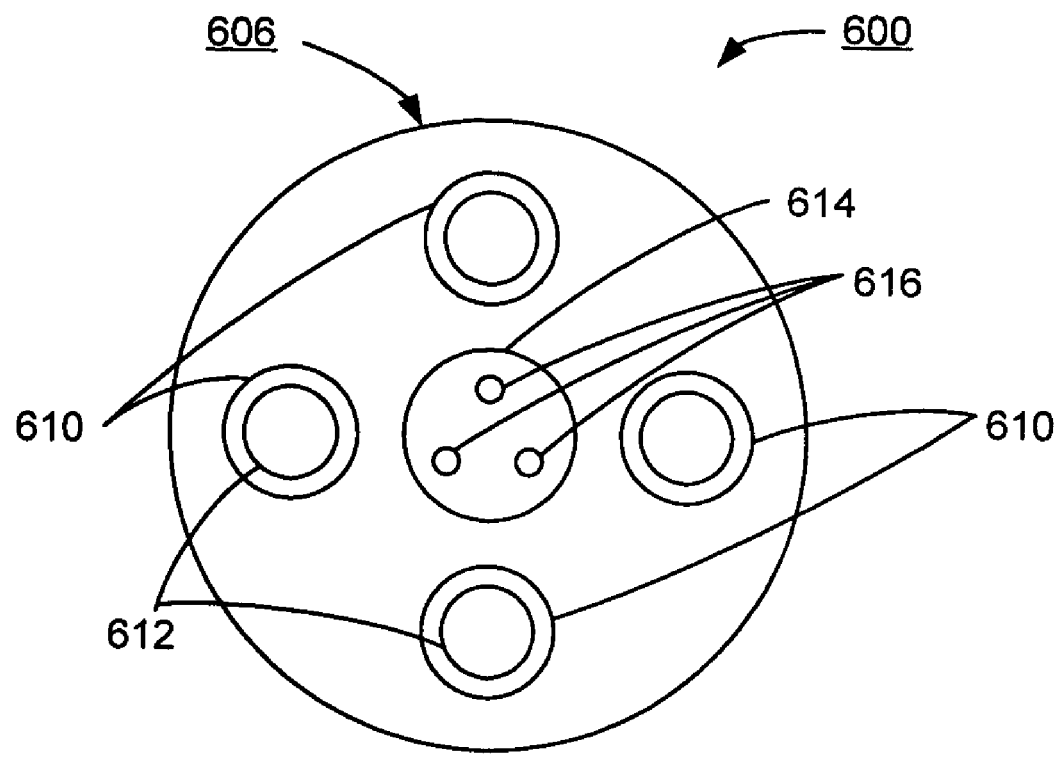
FIGS. 6A and 6B illustrate a miniature kinematical mounting sample holder of the automation system of FIG. 1 mounting in accordance with the preferred embodiment.
Figure 6B:
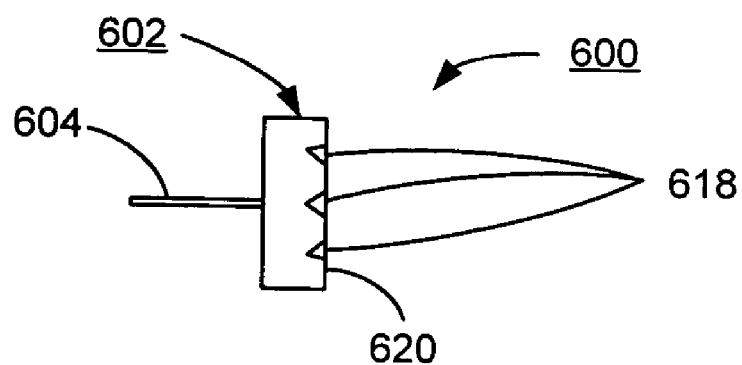

Referring now to FIGS. 6A and 6B, there is shown the miniature kinematical mounting sample holder generally designated by the reference character 600. The miniature kinematical mounting sample holder 600 includes a first support member 602 with a generally centrally disposed, outwardly extending, elongated rod or pin 604 and a base member 606. Base member 606 includes a plurality of enlarged recesses 610 surrounding openings 612 spaced apart around the base member. Base member 606 includes a generally centrally disposed circular ledge 614 carrying a plurality of positioning features 616 for cooperative operation with a plurality of features 618 defined on a mating face 620 of the support member 602 for precision positioning of a sample.

The Dewar container 112 is compatible with a variety of sample holders by changing Dewar's base-plate. Besides most popular commercial sample holders, such as "Hampton Pin" and "Yale Pin", the miniature kinematical mounting sample holder 600 was developed for high-precision applications. Near one-micron positioning reproducibility was acheved.

While the present invention has been described with reference to the details of the embodiments of the invention shown in the drawing, these details are not intended to limit the scope of the invention as claimed in the appended claims.

What is claimed is:

1. A robot-based automation system for cryogenic crystal sample mounting, for example, for use of cryogenic crystal sample mounting in the x-ray crystallography station at an x-ray source, said robot-based automation system comprising:
- a robot arm;
- a handset carried by said robot arm;
- said handset including a pair of elongated fingers for sample mounting,
- said handset including a liquid nitrogen reservoir; said reservoir carried by one of said elongated fingers; and
- each finger carrying a set of strain gauge arrays for providing force sensing.

2. A robot-based automation system as recited in claim 1 further includes a Dewar container; said Dewar container including an ice control system.

3. A robot-based automation system as recited in claim 2 wherein said Dewar container includes liquid nitrogen flow control.

4. A robot-based automation system as recited in claim 1 wherein said liquid nitrogen reservoir includes a check valve for filling said reservoir with liquid nitrogen and a pin hole for providing a nitrogen jet flow during the sample mounting and retrieval.

5. A robot-based automation system as recited in claim 1 further includes a miniature mounting sample holder; said miniature mounting sample holder includes a base member and a support member; said base member and said support member having cooperating features for precision positioning together.

6. A robot-based automation system as recited in claim 5 wherein said base member includes a plurality of enlarged recesses surrounding openings spaced apart around said base member.

7. A robot-based automation system as recited in claim 1 wherein said set of strain gauge arrays includes three strain gauge arrays bonded at a predefined area of each said finger.

8. A robot-based automation system as recited in claim 1 wherein each of said strain gauge arrays has a temperature compensating bridge sensing circuit configuration.

9. A robot-based automation system as recited in claim 1 wherein said set of strain gauge arrays is used for detecting contact force intensity and direction for each said finger.

10. A robot-based automation system as recited in claim 1 wherein said set of strain gauge arrays is used for providing a precise gripping action for each said finger.

11. A robot-based automation system as recited in claim 10 wherein said set of strain gauge arrays is used for providing feedback results of said precise gripping action for each said finger.

12. A robot-based automation system as recited in claim 1 wherein said robot arm has six-degree of freedom.

13. A robot-based automation system as recited in claim 1 includes a robot arm controller coupled to said robot arm.

14. A robot-based automation system as recited in claim 1 includes a triangular shaped sample magazine for containing a plurality of samples.

15. A robot-based automation system as recited in claim 14 includes a plurality of said triangular shaped sample magazine.

16. A robot-based automation system as recited in claim 1 includes a controller computer coupled to said robot arm and said set of strain gauge arrays.

17. A robot-based automation system as recited in claim 16 includes a video camera coupled to said controller computer.

18. A robot-based automation system as recited in claim 1 includes a Dewar container including an ice control system coupled to said controller computer.

19. A method for cryogenic crystal sample mounting in a robot-based automation system, said method comprising the steps of:
- providing a handset carried by a robot arm;
- mounting the sample with a pair of elongated fingers of said handset,
- including a liquid nitrogen reservoir with said handset; said reservoir carried by one of said elongated fingers; and
- sensing force of each finger with a set of strain gauge arrays carried by each of said elongated fingers for force sensing.

* * * * *